(12) United States Patent
Detlaff

(10) Patent No.: US 11,129,501 B2
(45) Date of Patent: Sep. 28, 2021

(54) CUTTING BOARD

(71) Applicant: Kohler Co., Kohler, WI (US)

(72) Inventor: Ryan Detlaff, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 271 days.

(21) Appl. No.: 16/577,677

(22) Filed: Sep. 20, 2019

(65) Prior Publication Data

US 2020/0093334 A1    Mar. 26, 2020

Related U.S. Application Data

(60) Provisional application No. 62/734,365, filed on Sep. 21, 2018.

(51) Int. Cl.
*A47J 47/00* (2006.01)

(52) U.S. Cl.
CPC .................. *A47J 47/005* (2013.01)

(58) Field of Classification Search
CPC .................................................. A47J 47/005
See application file for complete search history.

(56) References Cited

U.S. PATENT DOCUMENTS

| 3,385,357 | A | * | 5/1968 | Burg | A47J 47/005 |
| | | | | | 165/185 |
| 5,485,937 | A | * | 1/1996 | Tseng | A47G 19/02 |
| | | | | | 220/571 |
| 6,276,675 | B1 | * | 8/2001 | Shamoon | A47J 47/005 |
| | | | | | 222/158 |
| 2003/0218290 | A1 | * | 11/2003 | Goldberg | A47J 47/005 |
| | | | | | 269/289 R |
| 2017/0042382 | A1 | * | 2/2017 | Gromus | A47J 47/005 |

* cited by examiner

*Primary Examiner* — David P Bryant
*Assistant Examiner* — Nirvana Deonauth
(74) *Attorney, Agent, or Firm* — Foley & Lardner LLP

(57) ABSTRACT

A cutting board is configured to be suspended above a sink basin. The cutting board includes a top, cutting surface, and a bottom surface opposite the top surface. The cutting board also includes a bevel, an upper ledge, and a bumper. The bevel is disposed along a first edge of the bottom surface. The upper ledge extends outwardly beyond the bevel to support the cutting board along a rim of the sink or countertop. The bumper is disposed on the bevel and engages with the sink to prevent movement of the cutting board in one direction. The cutting board is configured to be used in both a mounted configuration above a basin of the sink and an unmounted configuration on a flat surface away from the sink.

20 Claims, 12 Drawing Sheets

CUTTING BOARD

CROSS-REFERENCE TO RELATED PATENT APPLICATIONS

This application claims the benefit of and priority to U.S. Provisional Application No. 62/734,365, filed Sep. 21, 2018, the entire disclosure of which is hereby incorporated by reference herein.

BACKGROUND

The present application relates generally to cutting boards for use in kitchen applications. More specifically, the present application relates to durable cutting boards adapted for use over a sink or other disposal region.

SUMMARY

One exemplary embodiment relates to a cutting board having a top surface and a bottom surface opposite the top surface. The cutting board includes a bevel, an upper ledge, and a bumper. The bevel is disposed along a first edge of the bottom surface. The upper ledge extends outwardly beyond the bevel. The bumper is disposed on the bevel.

Another exemplary embodiment relates to a cutting board. The cutting board includes a body including a bottom portion and a top portion. The bottom portion includes a bottom surface and a bevel disposed along a first edge of the bottom surface. The top portion includes a top surface oriented substantially parallel to the bottom surface, and an upper ledge extending outwardly beyond the bevel. The cutting board further includes a bumper disposed on the bevel.

DETAILED DESCRIPTION

Figure 1:
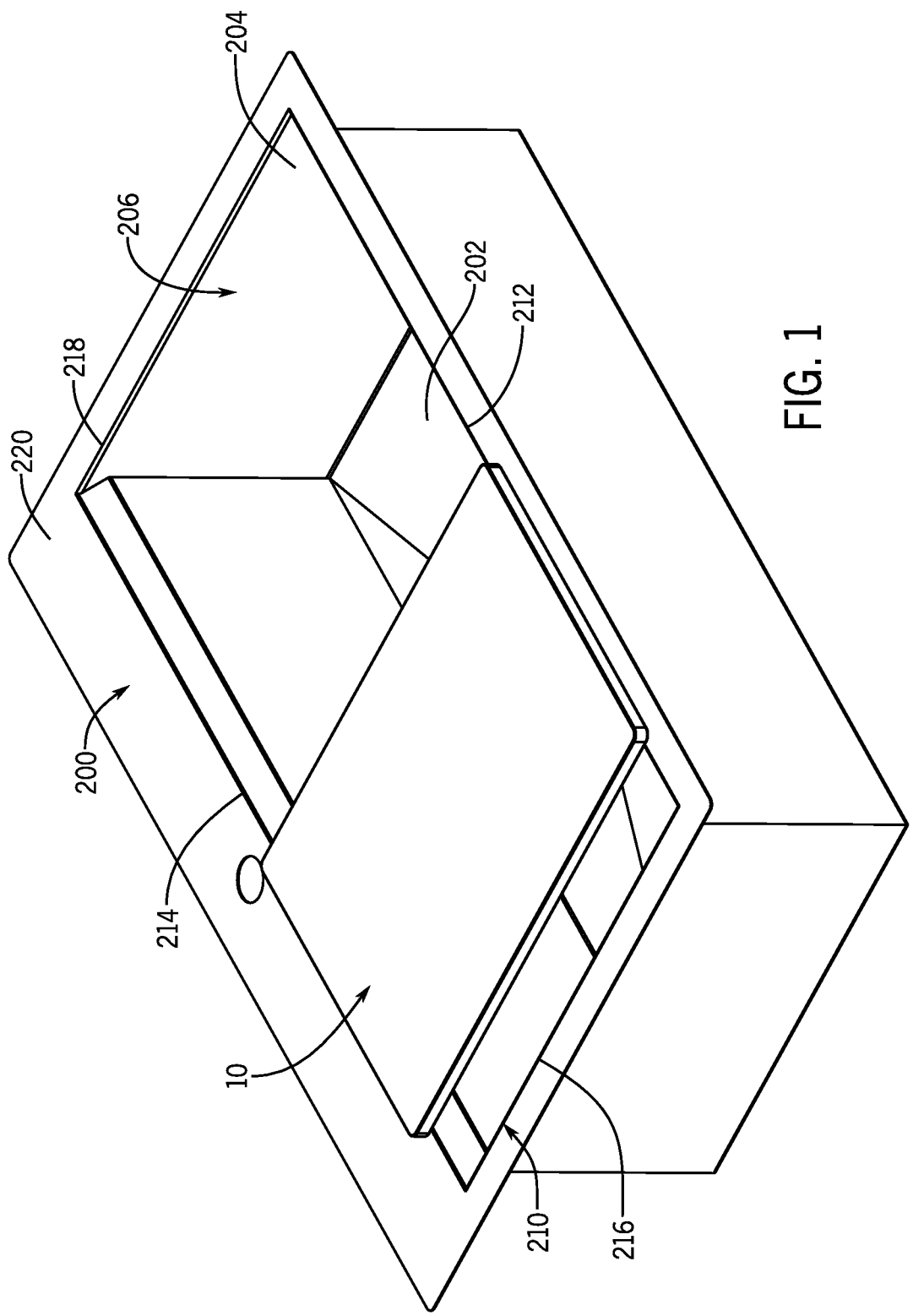
FIG. 1 is a perspective view of a cutting board and a sink, according to an illustrative embodiment.

Generally speaking, a cutting board may be adapted for use on a solid planar surface such as a countertop or other flat surface. Waste materials generated by a user during a cutting process are typically collected by the user after the cutting operation is complete and placed in a sink, garbage can, or other waste receptacle. A need exists for devices that simplify the food waste disposal process without sacrificing user safety.

One embodiment relates to a cutting board. The cutting board includes a body having a top portion and a bottom portion. The bottom portion includes a bottom surface and a first bevel disposed proximate to a first edge of the bottom surface. The top portion includes a top surface (a cutting surface) that is parallel to the bottom surface. The top portion further includes an upper ledge that extends outwardly from the cutting board, beyond the first bevel. The cutting board also includes a first bumper disposed on the first bevel.

In any of the above embodiments, the cutting board may be configured to engage with a rim of the sink along both a forward edge of the sink above a basin of the sink and a rear edge of the sink above the basin simultaneously. The first bevel may be configured to engage with a forward support bevel of the sink disposed proximate to the forward edge of the sink, while at the same time a second bevel of the cutting board may be configured to engage with a rear support bevel of the sink disposed proximate to the rear edge of the sink.

In any of the above embodiments, the cutting board may be configured to slide laterally from a first position above the sink to a second position above of the sink.

Another embodiment relates to a cutting board configured to be removably mounted above a sink. The cutting board includes a bevel disposed proximate to a first edge of a bottom surface of the cutting board. A first bumper is disposed on the bevel, the first bumper arranged to contact a supporting bevel that is disposed proximate to an upper edge of the sink. The cutting board further includes an upper ledge that is configured to extend beyond an edge of the sink and/or countertop cutout and contact a surface of the sink and/or countertop cutout.

Referring to the figures generally, the various illustrative embodiments disclosed herein relate to a cutting board that may be placed securely over a sink (e.g., on a ledge of a sink or on a ledge of a countertop surrounding a sink) or used as a standalone cutting surface on a countertop. When placed over a sink, the cutting board is configured to engage or interface with the sink (and/or the countertop) in multiple locations, such as along a forward side of the sink (e.g., on a user side of the sink) and also along a rear side of the sink (e.g., on a faucet side of the sink away from the user). The cutting board is supported by a rim surface extending along an upper edge of the sink and is configured to engage the sink in a way that prevents the cutting board from falling into the sink during use. The cutting board is dimensioned such that a user may slide the cutting board into different positions above a basin of the sink. The cutting board advantageously includes a set of bumpers that prevent the user from accidentally pushing the cutting board out of position while cutting a food product. In particular, the bumpers resist front-to-back or back-to-front motion of the cutting board with respect to the sink, either toward the faucet or the user, thereby preventing the cutting board from disengaging with the rim surface (e.g., ledge of the sink along a perimeter of the sink) and falling into the basin.

When configured as a countertop cutting surface, a lower surface of the cutting board rests flush on the countertop, providing a large surface area of contact between the cutting board and the countertop, which helps to prevent the cutting board from sliding or shifting position relative to the countertop. The details of the general depiction provided above will be more fully explained with reference to FIGS. 1-12.

FIG. 1 shows a board, shown as cutting board 10, for use in food preparation in a kitchen environment, according to an illustrative embodiment. The cutting board 10 provides a durable surface for cutting a wide variety of different foods such as fruits, vegetables, meats, etc. The cutting board 10 may be produced from one of a variety of different materials depending on the nature of its use. Typical materials include wood, bamboo, plastics (e.g., polyethylene), and various other hard surface materials such as glass, metal, etc.

Figure 2:
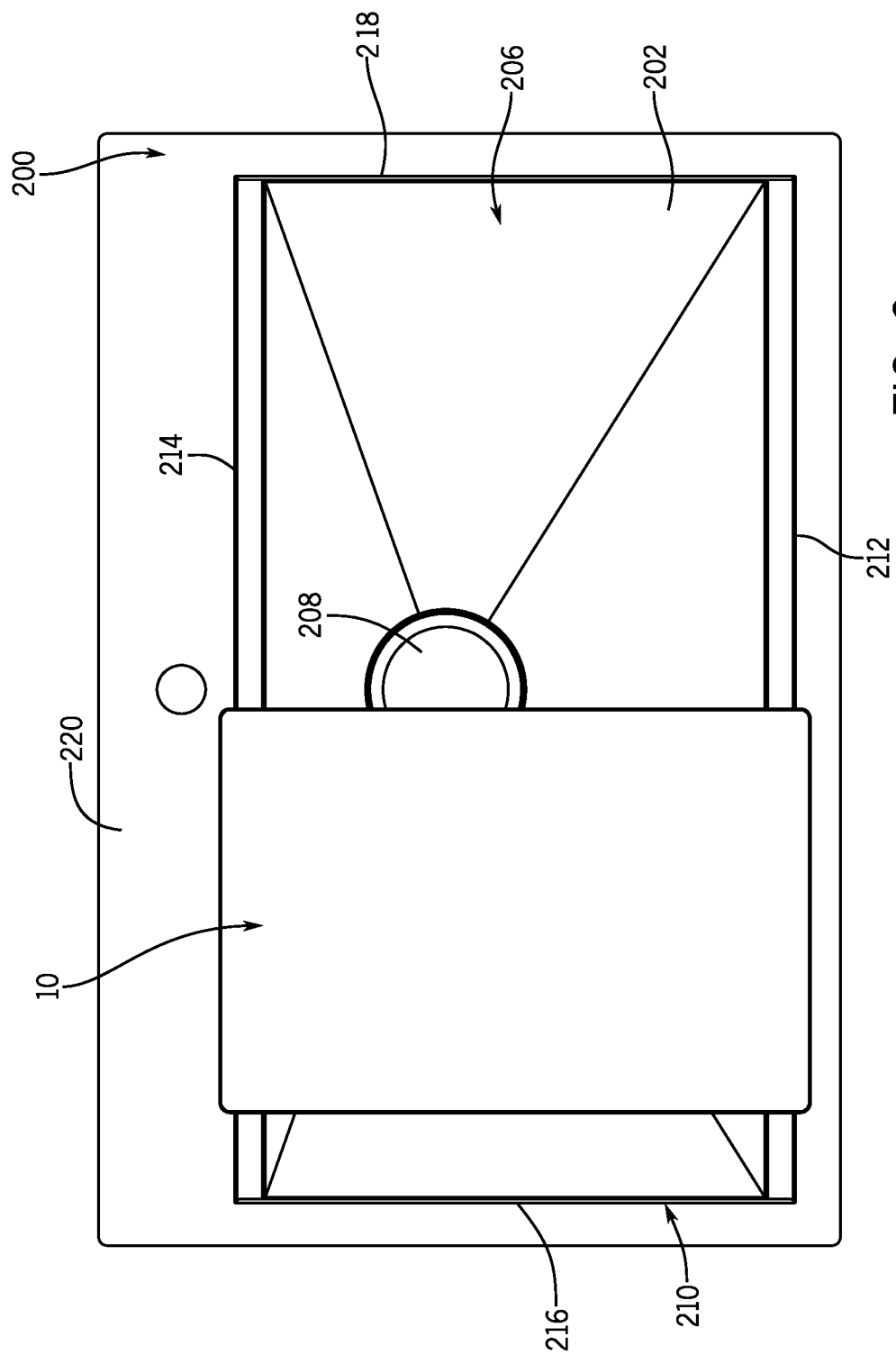
FIG. 2 is a top view of the cutting board and sink of FIG. 1.

In the embodiment of FIG. 1, the cutting board 10 is configured to be suspended above a basin of a sink 200 such that any food products that slide off of the cutting board 10 fall into the basin of the sink 200. The sink 200 includes a lower wall 202 (e.g., a floor or bottom surface) and side walls 204 that are oriented in a direction that is substantially perpendicular to the lower wall 202. Together, the lower wall 202 and the side walls 204 define a basin 206 into which food products, cookware (e.g., pots, pans, etc.), dishware (plates, bowls, etc.), and various other kitchen items are received. The sink 200 also includes a drain 208 (see FIG. 2) through which water and leftover food products may be removed from the basin 206. As shown in FIGS. 1-2, the drain 208 is disposed in a central location in the lower wall 202 of the sink 200, although according to other exemplary embodiments, the drain may be provided in other locations within the sink.

Figure 3:
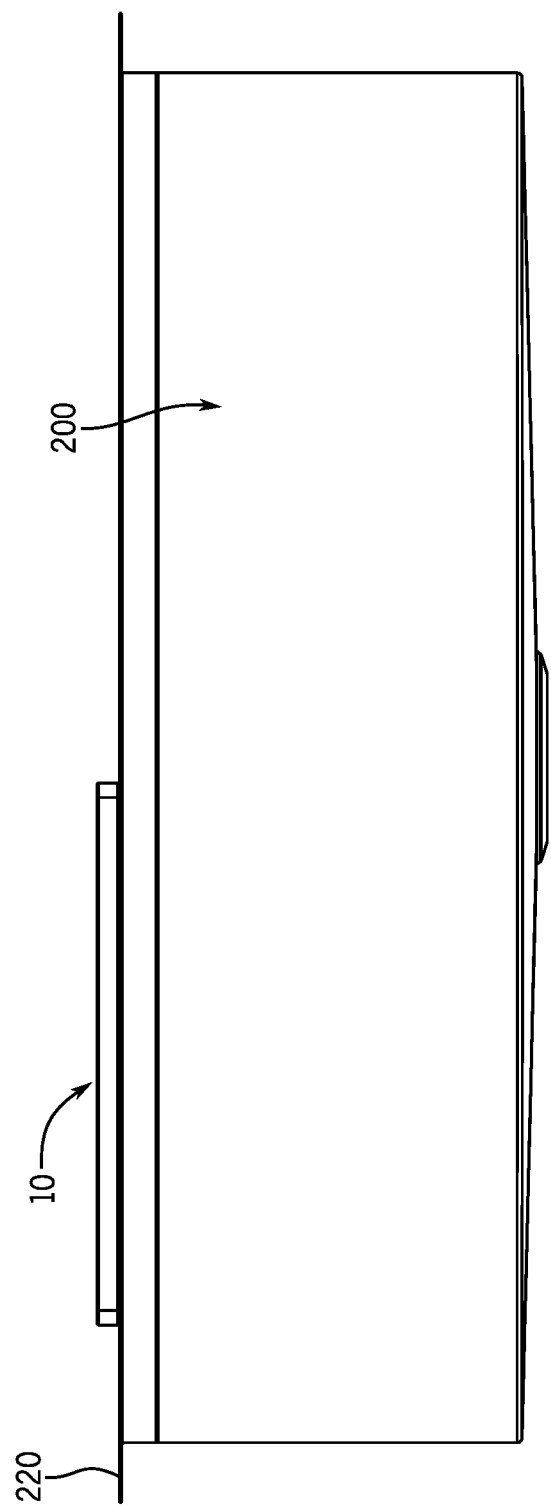
FIG. 3 is a front view of the cutting board and sink of FIG. 1.

The sink 200 may be any one of a variety of different types. In the embodiment of FIGS. 1-3, the sink 200 is a top mount or drop-in sink 200 configured to be installed, from above, into a hole cut into a countertop. In some embodiments, the sink is an undermount sink that is attached from below the countertop. The undermount sink is attached to the countertop using clips, bolts, or another suitable fastener. In yet other embodiments, the sink is a freestanding sink that is not surrounded by a countertop. The freestanding sink is set upon a freestanding table or support, or fixed against a wall to secure the sink in position. In the embodiment shown in FIGS. 1-2, the sink 200 has a single basin 206. According to other exemplary embodiments, the sink is a double basin or bowl sink that includes a greater number of basins. The materials used in the construction of the sink may also vary (e.g., stainless steel, composite granite, fireclay, etc.) depending on the application and user preference.

As shown in FIGS. 1-2, the sink 200 additionally includes an opening 210 through which the basin 206 is accessed. The opening 210 is defined by an upper edge of the sink 200 that extends around a perimeter of the basin 206. The opening 210 approximates a rectangle and includes a forward edge 212, a rear edge 214, a left side edge 216, and a right side edge 218. The rear edge 214 is substantially parallel to the forward edge 212, which is substantially perpendicular to each of the left side edge 216 and the right side edge 218. Both the left side edge 216 and the right side edge 218 are substantially perpendicular the forward edge 212 and rear edge 214. As shown in FIG. 1, the forward edge 212 is located proximate to where a user might stand, while the rear edge 214 is located on the other side of the sink 200, proximate to where a faucet or other water dispensing device for the sink 200 would be located.

The sink 200 further includes a rim surface (e.g., lip), shown as rim 220 that extends around the perimeter of the sink 200. In the embodiment of FIGS. 1-3, the rim 220 extends away from the upper edge of the basin 206, in a direction that is substantially perpendicular to the side walls 204. The rim 220 is configured set the height of the sink 200 relative to the countertop and carries the weight of the sink 200 once installed into the countertop. Once installed, the sink 200 is generally secured in position using silicone or another suitable adhesive between the rim 220 and an upper surface of the countertop.

FIG. 2 shows a top view of the cutting board 10 and sink 200 combination, according to an illustrative embodiment. FIG. 2 shows the cutting board 10 installed in a top mount sink. Alternatively, the sink may be an undermount sink, in which case the cutting board 10 would be configured to engage with substantially similar features of a cutout in a countertop.

Figure 4:
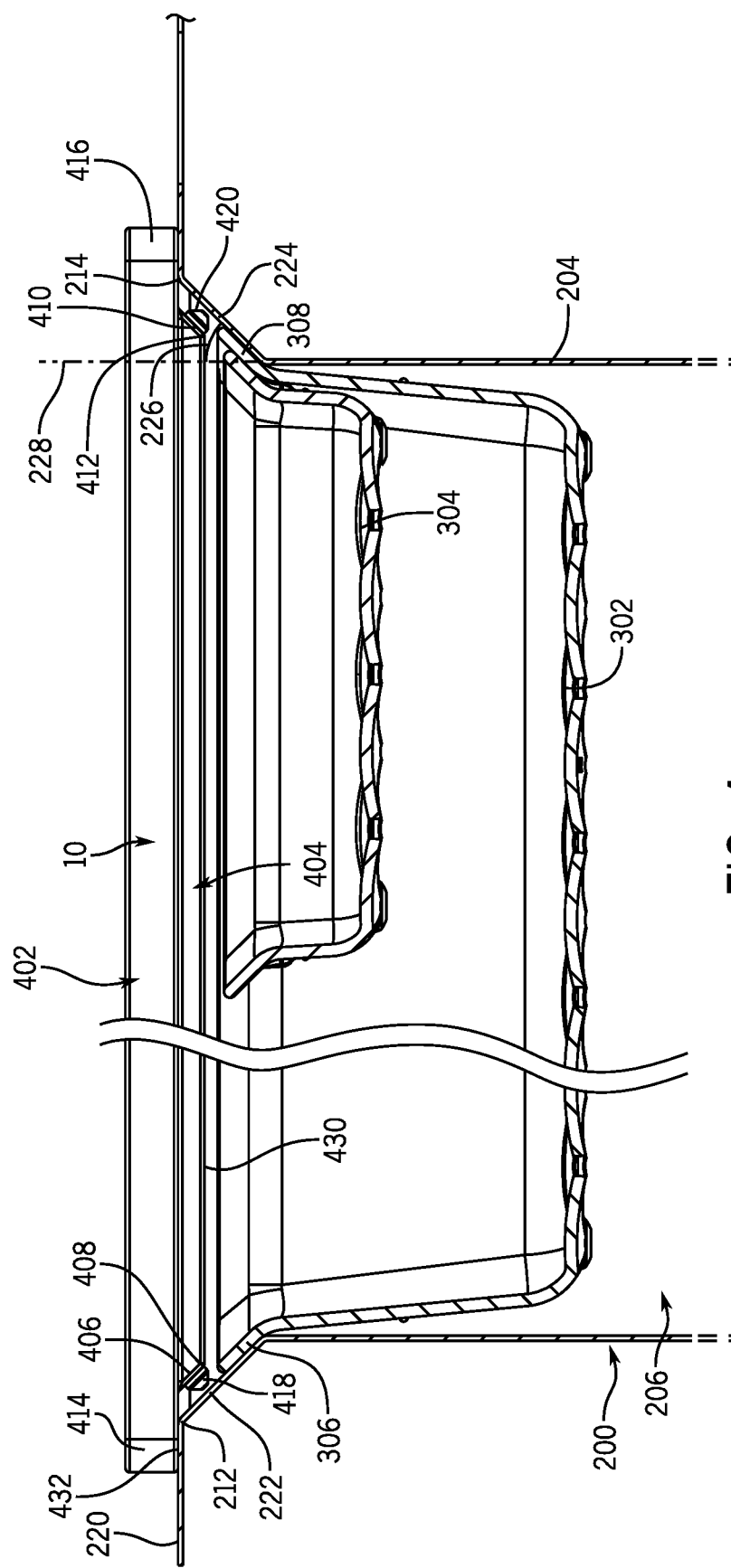
FIG. 4 is a side view of the cutting board and sink of FIG. 1, including a colander in the sink below the cutting board, at a cross-section through a central position on the cutting board, according to an illustrative embodiment.

As shown in FIG. 4, the sink 200 includes one or more bevels disposed along the upper edge of the sink 200. Among these are a forward support bevel 222 that extends along the forward edge 212 of the sink 200 and a rear support bevel 224 that extends along the rear edge 214 of the sink 200. As shown in FIG. 4, each support bevel 222, 224 connects a corresponding one of the side walls 204 with the rim 220. Each support bevel 222, 224 is formed at an angle, shown as bevel angle 226, with a vertical reference line 228 that extends through a corresponding one of the side walls 204. In various embodiments, the bevel angle 226 is within a range between 30° and 60°, although angles outside this range may also be used. In the embodiment of FIG. 4, the bevel angle 226 is about 45°.

In an alternative embodiment, the sink is an undermount sink. The undermount sink may be disposed beneath a cutout in a countertop. One or more bevels may be disposed along an edge of the cutout proximate to an upper edge of the sink. For example, a forward support bevel may be disposed along a forward edge of the cutout proximate to (e.g., close to) the forward edge of the sink and a rear support bevel may be disposed along a rear edge of the cutout proximate to (e.g., close to) a rear edge of the sink.

Still referring to FIG. 2, the cutting board 10 is configured to engage with the rim 220 along the forward edge 212 and the rear edge 214 of the sink 200. As shown in FIG. 2, the cutting board 10 is configured to contact the rim 220 along both the forward edge 212 and the rear edge 214 of the sink 200 simultaneously such that the cutting board 10 bridges a gap across the basin 206. The cutting board 10 covers a portion of the basin 206 in at least one lateral position (e.g., a position between the left side edge 216 and the right side edge 218), which may be adjusted depending on the needs of the user.

The forward support bevel 222 and the rear support bevel 224 may be used to support one of a variety of devices within the basin 206. In the embodiment of FIG. 4, the forward and rear support bevels 222, 224 are used to support the cutting board 10 along with a series of nested colanders 302, 304 above the lower wall 202 of the basin 206. A lower colander 302 is disposed within the sink basin 206, while an upper colander 304 is disposed within the lower colander 302. The lower colander 302 includes angled surfaces that engage with the support bevel to prevent the colanders 302, 304 from being inserted past a predetermined point within the basin 206. As shown in FIG. 4, a forward angled surface 306 of the lower colander 302 engages with the forward support bevel 222 and a rear angled surface 308 of the lower colander 302 engages with the rear support bevel 224. The configuration of colanders 302, 304 provides a user the ability to remove water from one or more food products without the food products contacting the basin 206.

FIG. 4 shows the cutting board 10 removably coupled to the sink 200, according to an illustrative embodiment. The cutting board 10 is configured to engage with (e.g., sit on)

the rim 220 of the sink 200 along both the forward edge 212 and the rear edge 214 such that the cutting board 10 is supported by the rim 220. The cutting board 10 includes beveled surfaces disposed proximate to a bottom surface 430 of the cutting board 10. In the embodiment of FIG. 4, the cutting board 10 includes two beveled surfaces, a first bevel 406 that extends along a first edge 408 of the cutting board 10 and a second bevel 410 that extends along a second edge 412 of the cutting board 10.

Figure 5:
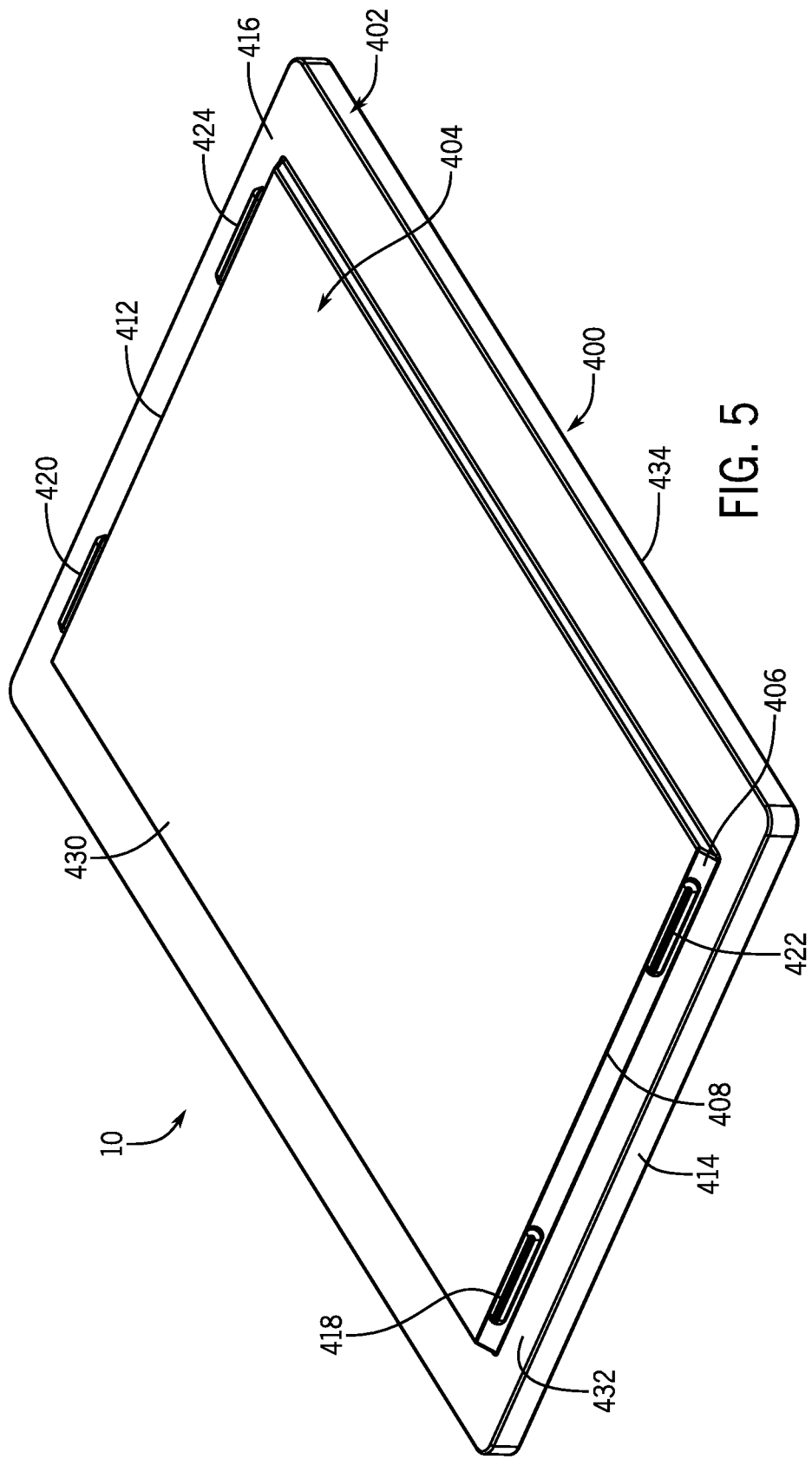
FIG. 5 is a perspective view of a bottom surface of the cutting board of FIG. 1.
Figure 6:
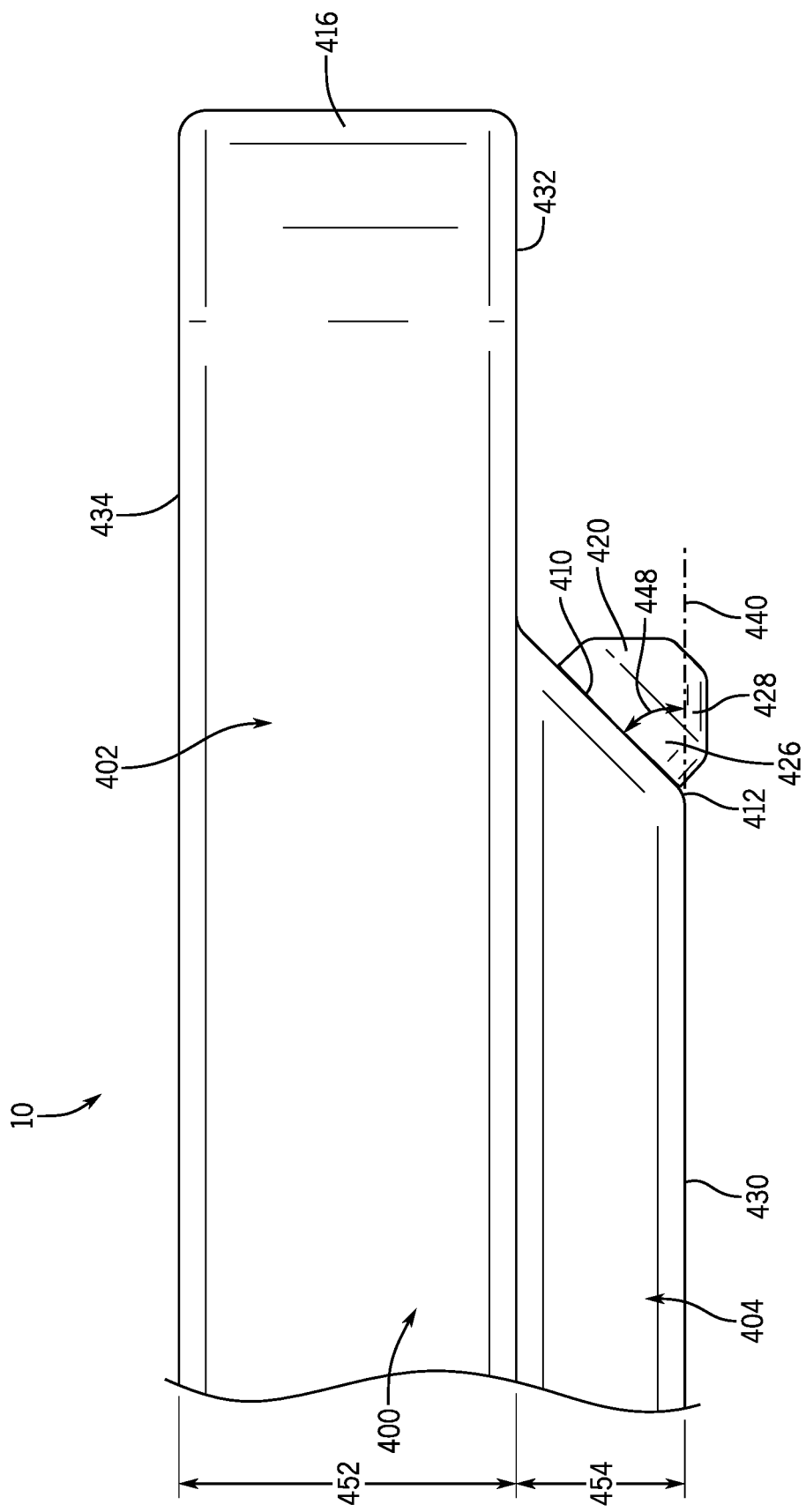
FIG. 6 is a side view of the cutting board of FIG. 1, in an area near a bevel of the cutting board.

The cutting board 10 further includes an upper ledge configured to contact a surface of at least one of the sink 200 (e.g., the rim 220) and the countertop to prevent the cutting board 10 from falling into the basin 206 during normal use. In the embodiment of FIGS. 4-6, the cutting board 10 includes a first upper ledge 414 configured to engage with the sink 200 proximate to the forward edge 212 (see FIG. 4) and a second upper ledge 416 configured to engage with the sink 200 proximate to the rear edge 214. Alternatively, the orientation of the cutting board 10 may be reversed (e.g., the first upper ledge 414 contacting the rear edge 214 and the second upper ledge 416 contacting the forward edge 212). As shown in FIG. 4, each of the first upper ledge 414 and the second upper ledge 416 are configured to extend beyond one of the forward edge 212 and the rear edge 214 across at least a portion of the rim 220 along the forward edge 212 and the rear edge 214 such that a downward facing surface 432 of each ledge 414, 416 contacts the rim 220 of the sink 200.

Each of the first bevel 406 (see FIG. 5) and the second bevel 410 form an angle, shown as board bevel angle 448 (see FIG. 6), with a reference plane 440 that extends along the bottom surface 430 of the cutting board 10. In various embodiments, the board bevel angle 448 is between 30° and 60°, inclusive, although angles outside of this range may also be used. In the illustrative embodiment of FIG. 6, the board bevel angle 448 is approximately equal to the bevel angle 226 of the support bevel 222, 224 (also see FIG. 4), or about 45°. Matching the board bevel angle 448 and the bevel angle 226 ensures that any bumper elements attached to one or both of the first and second bevel 406, 410 will solidly contact the sink 200 (e.g., during an event where a user applies a significant force on the cutting board 10 toward one of the forward edge 212 or rear edge 214 of the sink 200 and/or countertop cutout).

As shown in FIGS. 4-6, the cutting board 10 additionally includes a plurality of bumpers or grips disposed on one of the first bevel 406 and the second bevel 410. Among other benefits, including a plurality of bumpers on the bevels 406, 410 of the cutting board 10 provides an additional mechanism for increasing the frictional force required to dislodge the cutting board 10 from the sink 200 during normal use. In the embodiment of FIGS. 4-5, the cutting board 10 includes four bumpers; a first bumper 418 and a third bumper 422 disposed on the first bevel 406, and a second bumper 420 and a fourth bumper 424 disposed on the second bevel 410. In other embodiments, the number, size, and arrangement of bumpers may be different. As shown in FIG. 4, each bumper 418, 420, 422, 424 is arranged to contact one of the forward support bevel 222 and the rear support bevel 224. As shown in FIG. 5, each bumper 418, 420, 422, 424 is a thin elongated piece of material configured to increase the frictional force required to dislodge the cutting board 10 from the support bevel 222, 224 (e.g., during an event where a user applies a force toward either the forward edge 212 or the rear edge 214 of the sink 200 as shown in FIG. 4). As shown in FIG. 6, each bumper 418, 420, 422, 424 includes a base portion 426 and a tapered portion 428. The base portion 426 is configured to interface with one of the first bevel 406 and the second bevel 410, while the tapered portion 428 is configured to interface with the support bevel 222, 224 of the sink 200 (see also FIG. 4).

Figure 7:
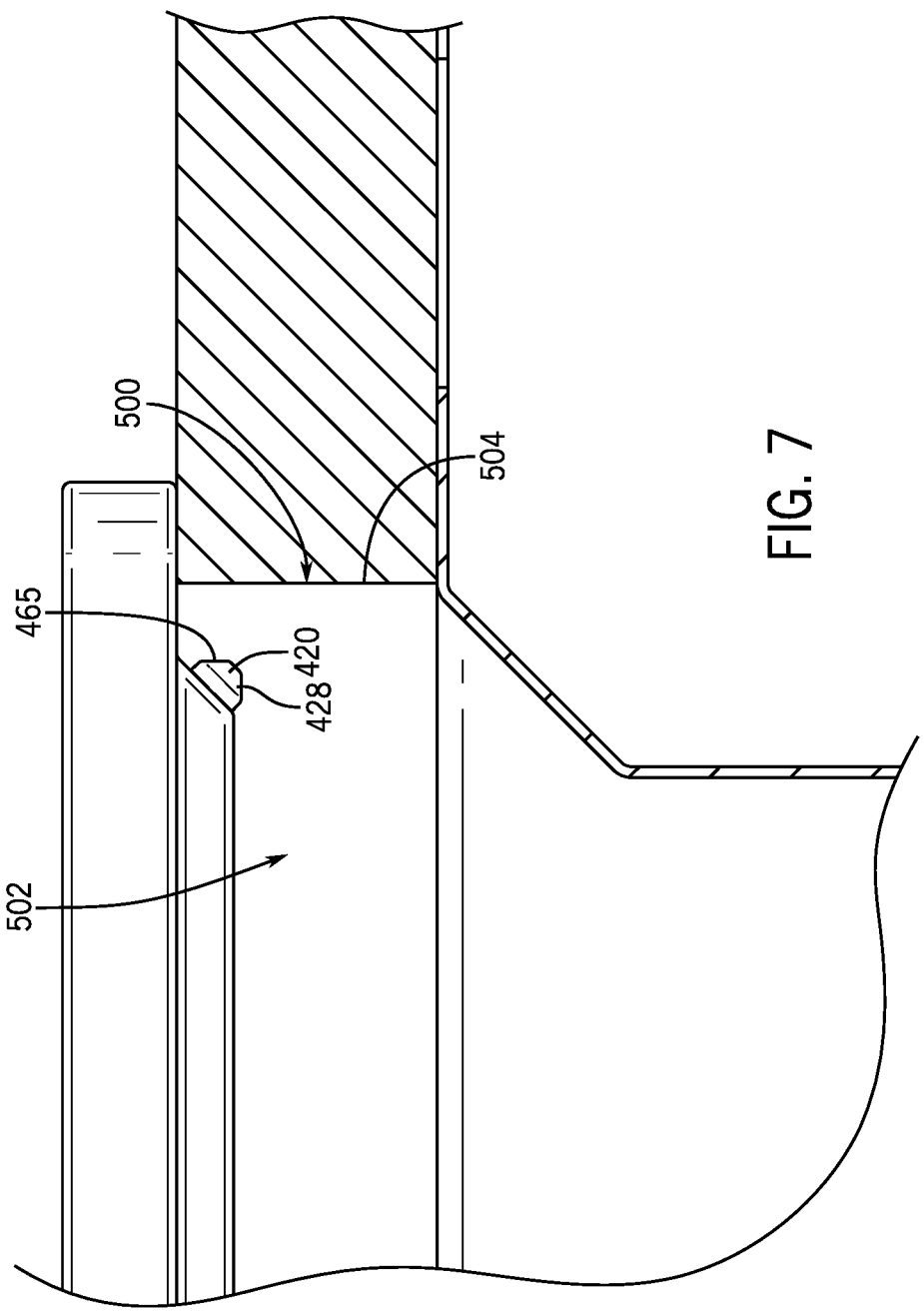
FIG. 7 is a side view of the cutting board of FIG. 1 engaged with a countertop cutout, according to an illustrative embodiment.

As shown in FIG. 7, in an embodiment where the sink is configured as an undermount sink, the bumpers 418, 420, 422, 424 may be configured to solidly contact a countertop cutout 500. As shown in FIG. 7, the bumpers 418, 420, 422, 424 fit within the countertop cutout 500 (e.g., an opening 502 defined by the countertop cutout) and help to locate the cutting board 10 above the sink. A vertical surface 465 of each bumper 418, 420, 422, 424 (e.g., an outer surface of the tapered portion 428 of each bumper 418, 420, 422, 424) is configured to contact a vertical forward and/or vertical rear inner surface 504 of the countertop cutout 500 to prevent the cutting board 10 from being displaced from the cutout 500 or from falling into the basin of the sink.

The bumpers 418, 420, 422, 424 may be formed in any of a variety of different shapes and sizes. In one illustrative embodiment, each bumper is a small circular pad of uniform thickness. In another embodiment, each bumper is a thin sheet that completely covers one of the first bevel 406 and the second bevel 410. In yet other embodiments, each bumper tapers to a point (see FIG. 6) to increase the compression force on the bumper when the bumper is positioned between the cutting board 10 and sink 200. Any number of bumpers may be disposed on the first bevel 406 and the second bevel 410. The bumpers 418, 420, 422, 424 shown in FIGS. 4-6 are made from a soft compliant material suited to increase the coefficient of friction between the support bevel 222, 224 and the cutting board 10. Examples of suitable bumper materials include rubber (e.g., nitrile rubber, silicone rubber, etc.) or soft plastic that may be molded or formed to fit within the geometry of either the first bevel 406 or the second bevel 410.

Figure 8:
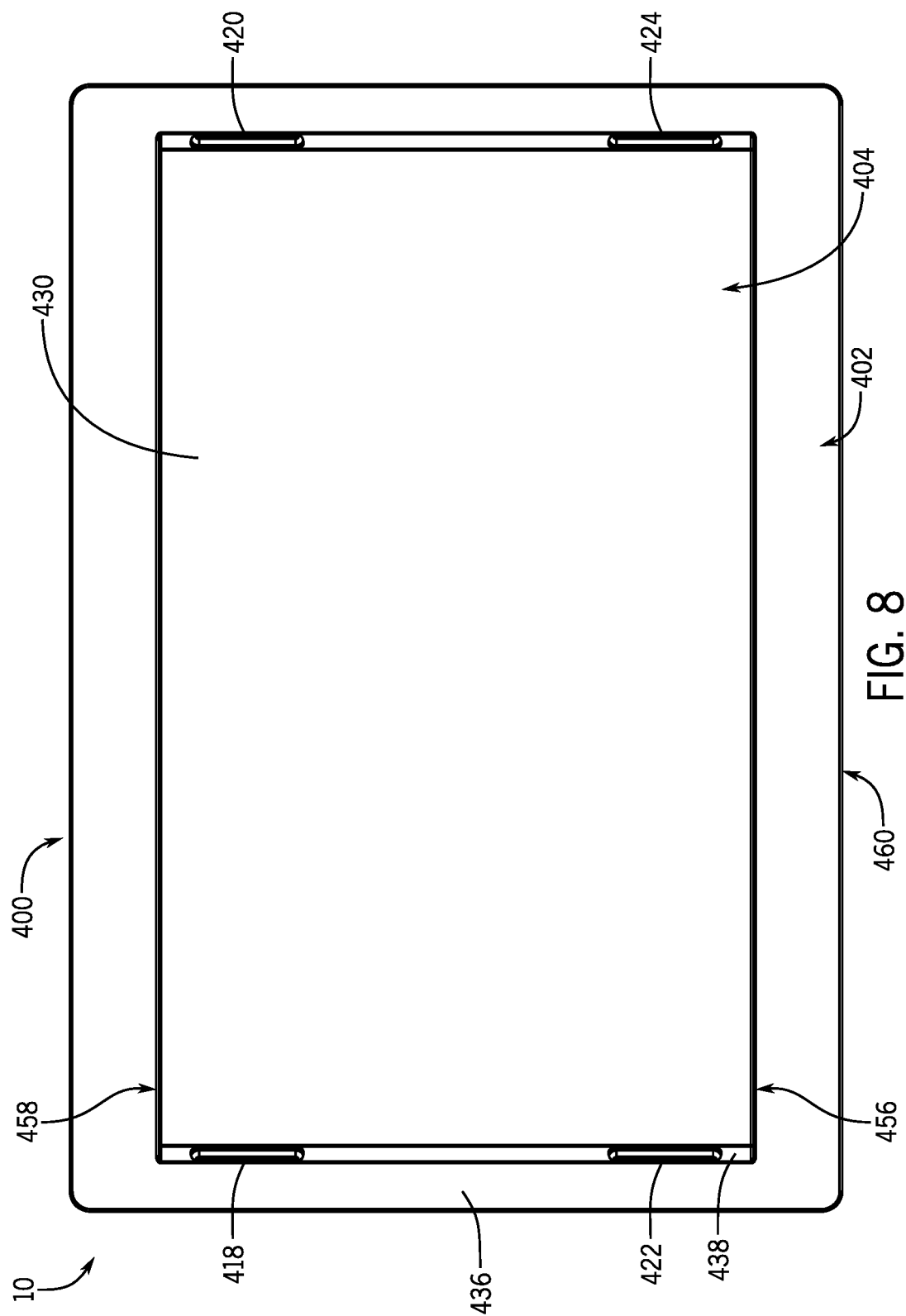
FIG. 8 is a bottom view of the cutting board of FIG. 1.

The cutting board 10 is configured for use both in a mounted position over the sink 200 (e.g., mounted against the sink, a countertop cutout above the sink, etc.) and an unmounted position where the cutting board 10 is placed on a flat surface away from the sink 200 (e.g., a countertop surface). In an illustrative embodiment, as shown in FIG. 6, each of the bumpers 418, 420, 422, 424 is positioned at least partially below the reference plane 440 that is coplanar with the bottom surface 430 of the cutting board 10. Among other benefits, this allows the bumpers 418, 420, 422, 424 to contact the countertop or other flat surface upon which the cutting board 10 may be set in the unmounted position. The bumpers 418, 420, 422, 424 increase the frictional force that prevents movement of the cutting board 10 in the unmounted position. In some embodiments, the bumpers 418, 420, 422, 424 may be positioned such that the bottom surface 430 of the cutting board 10 may also contact the countertop to provide a stable interface against the flat surface. As shown in FIGS. 5 and 8, a cross-sectional area of the bottom surface 430 of the cutting board 10 can be sized to provide sufficient contact with the flat surface to prevent unwanted movement or sliding of the cutting board 10 while in use. Alternatively, or in combination, the bottom surface 430 of the cutting board 10 may be ribbed or outfitted with one or more components that increase the coefficient of friction between the cutting board 10 and the flat surface (e.g., rubber supports, etc.).

As shown in FIGS. 5-6, the cutting board 10 includes a body 400 having a top portion 402 and a bottom portion 404. The bottom portion 404 includes the part of the cutting board 10 disposed between the bottom surface 430 and the downward facing surface 432 of one or both of the first upper ledge 414 and the second upper ledge 416. As shown in FIG.

4, the bottom surface 430 of the bottom portion 404 faces toward the basin 206 when the cutting board 10 is engaged with the sink 200. The remainder of the cutting board 10 (e.g., between the top surface 434 and the first upper ledge 414 and the second upper ledge 416, inclusive) is the top portion 402.

As shown in FIGS. 5-6, the top portion 402 of the cutting board 10 includes a top surface 434 (e.g., a cutting surface) that is substantially parallel to the bottom surface 430. As shown in FIG. 6, a height 452 of the top portion 402 is greater than a height 454 of the bottom portion 404, although in other embodiments, either height may be different. For example, in an illustrative embodiment, the height of the bottom portion 404 of the cutting board 10 is greater than the height of the top portion 402. Among other benefits, increasing the height of the bottom portion 404 will increase the weight of the cutting board 10 (and correspondingly, the force required to dislodge the cutting board from the sink 200). Increasing the height of the bottom portion 404 will also require that the cutting board 10 be moved a greater distance, toward one of the forward edge 212 or the rear edge 214, before becoming dislodged from the sink 200.

The top portion 402 of the cutting board 10 is shaped differently than the bottom portion 404. As shown in FIGS. 5-6, the top portion 402 of the cutting board 10 has a uniform thickness (e.g., the top portion 402 is a right prism with identical cross-sections along planes that are substantially parallel to the top surface 434), while the bottom portion 404 is tapered. As shown in FIG. 8, a first cross-sectional area 436 of the cutting board 10, at a first location that is proximate to the bottom portion 404, is greater than a second cross-sectional area 438 of the bottom portion 404 at a second location that is proximate to the top portion 402. The first cross-sectional area 436 is bounded by a solid line in FIG. 8, while the second cross-section area 438 is bounded by a dashed line. In the embodiment of FIG. 8, both the first cross-section area 436 and the second cross-sectional area 438 are approximately rectangular in shape. Alternatively, one or both of the first cross-sectional area 436 and the second cross-sectional area 438 may have a different shape (e.g., circular, oval, etc.). Among other benefits, the size and position of the bottom portion 404 with respect to the top portion 402 allows the cutting board 10 to mate snuggly against the support bevels 222, 224 (or a vertical edge of a countertop cutout) in a position that is centered between the forward edge 212 and the rear edge 214 of the sink 200 or countertop cutout (see FIG. 4).

Figure 9:
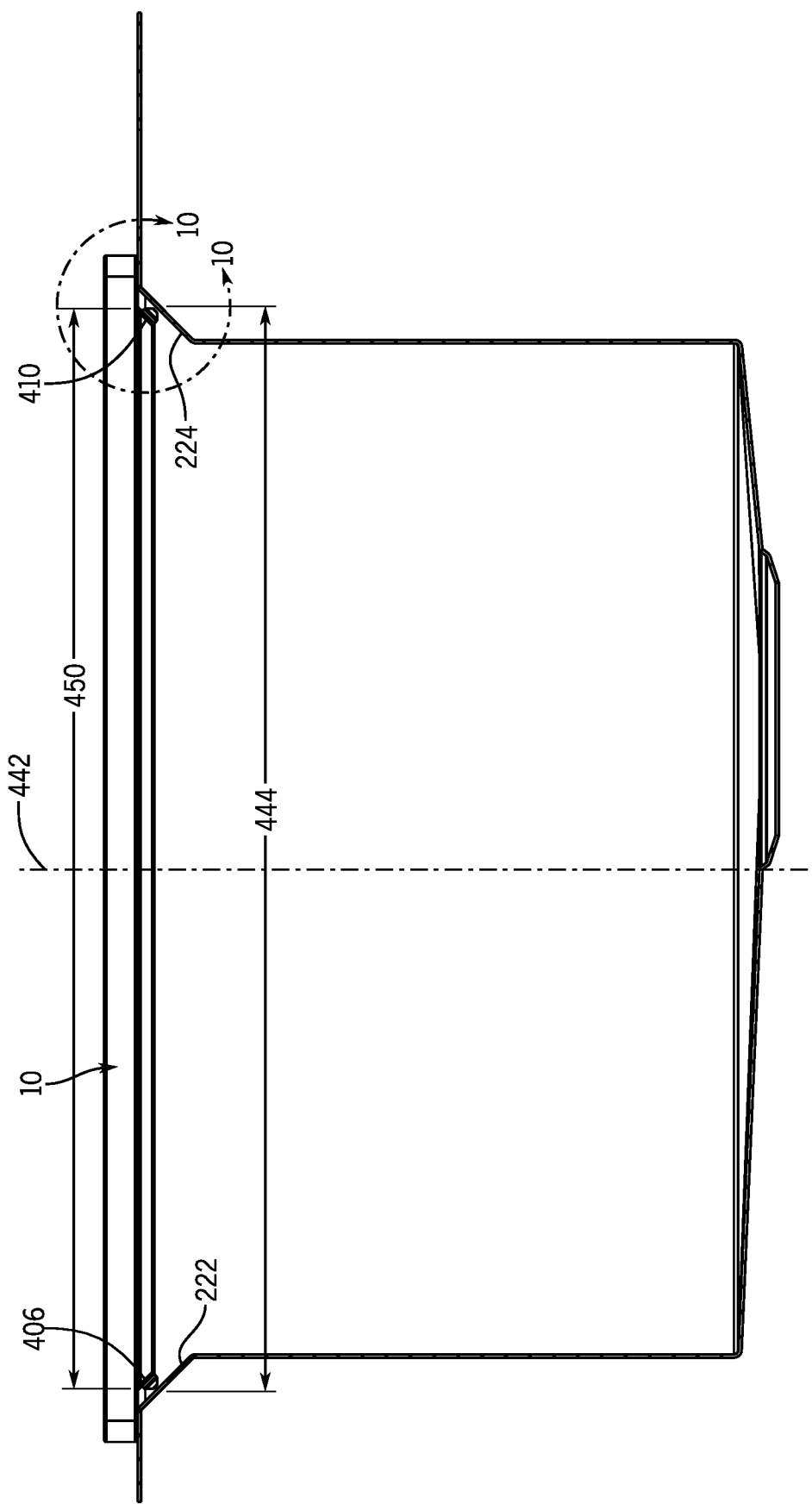
FIG. 9 is a side view of the cutting board and sink of FIG. 1, at a cross-section through a central position on the cutting board.
Figure 10:
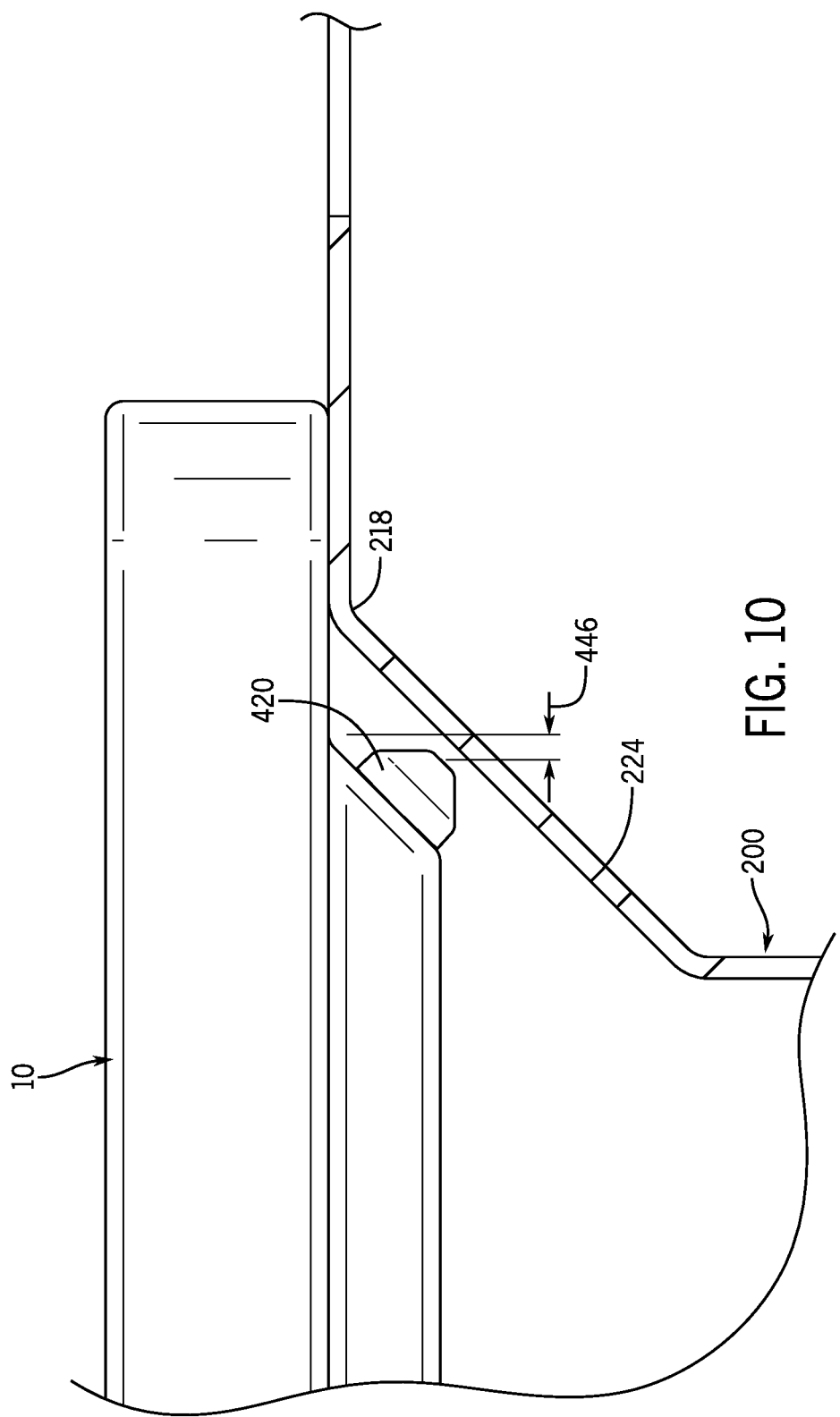
FIG. 10 is a detailed view of FIG. 9, showing a region near an interface between the cutting board and the sink.

FIGS. 9-10 provide a side cross-sectional view of the cutting board 10 in the mounted position, according to an illustrative embodiment. As shown in FIGS. 9-10, the cutting board 10 is configured to be positioned within the sink 200 such that the first bevel 406 is proximate to the forward support bevel 222 and, at the same time, the second bevel 410 is proximate to the rear support bevel 224. As shown in FIG. 9, a width 450 of the cutting board 10 at a location along a central axis 442 of the sink 200 (e.g., between a point on the first bumper 418 that is configured to contact the forward support bevel 222 and a point on the second bumper 420 that is configured to contact the rear support bevel 224) is less than a width 444 of the sink 200 at the same location along the central axis 442. As shown in FIG. 10, the difference in width between the bottom portion 404 of the cutting board 10 and the sink 200 results in a gap, shown as gap 446, between the bumpers 418, 420, 422, 424 and one of the forward support bevel 222 and the rear support bevel 224. When centered, the size of the gap 446, on either side of the cutting board 10 is approximately equal, which allows the cutting board 10 to slide laterally from a first position above the sink 200 (e.g., proximate to a left side edge 216 of the sink 200) to a second position above the sink 200 (e.g., proximate to a right side edge 218 of the sink 200).

In various alternative embodiments, the width between the bottom portion 404 of the cutting board 10 and the sink 200 may be different; for example, the widths may be equal to prevent movement of the cutting board 10 in any direction relative to the sink 200 during use. In an embodiment where the sink is configured as an undermount sink (see FIG. 7), the width 450 of the cutting board is less than a width of the countertop cutout (e.g., a width between a vertical forward edge or a vertical rear edge of the countertop cutout) such that the cutting board may slide laterally from a first position above the sink to a second position above the sink.

Figure 11:
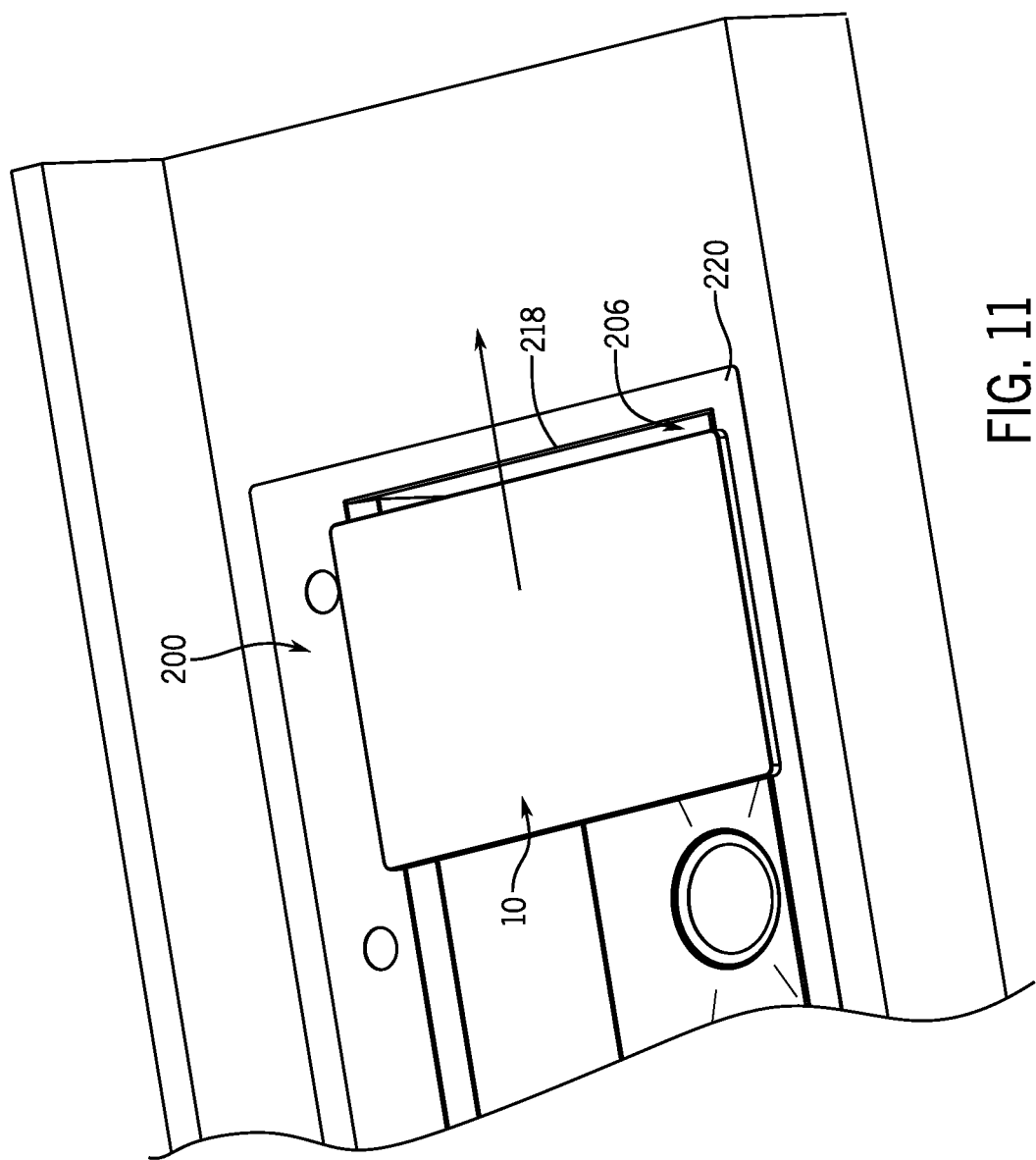
FIG. 11 is a perspective view of the cutting board of FIG. 1 engaged with a top mount sink above a basin of the top mount sink, according to an illustrative embodiment.
Figure 12:
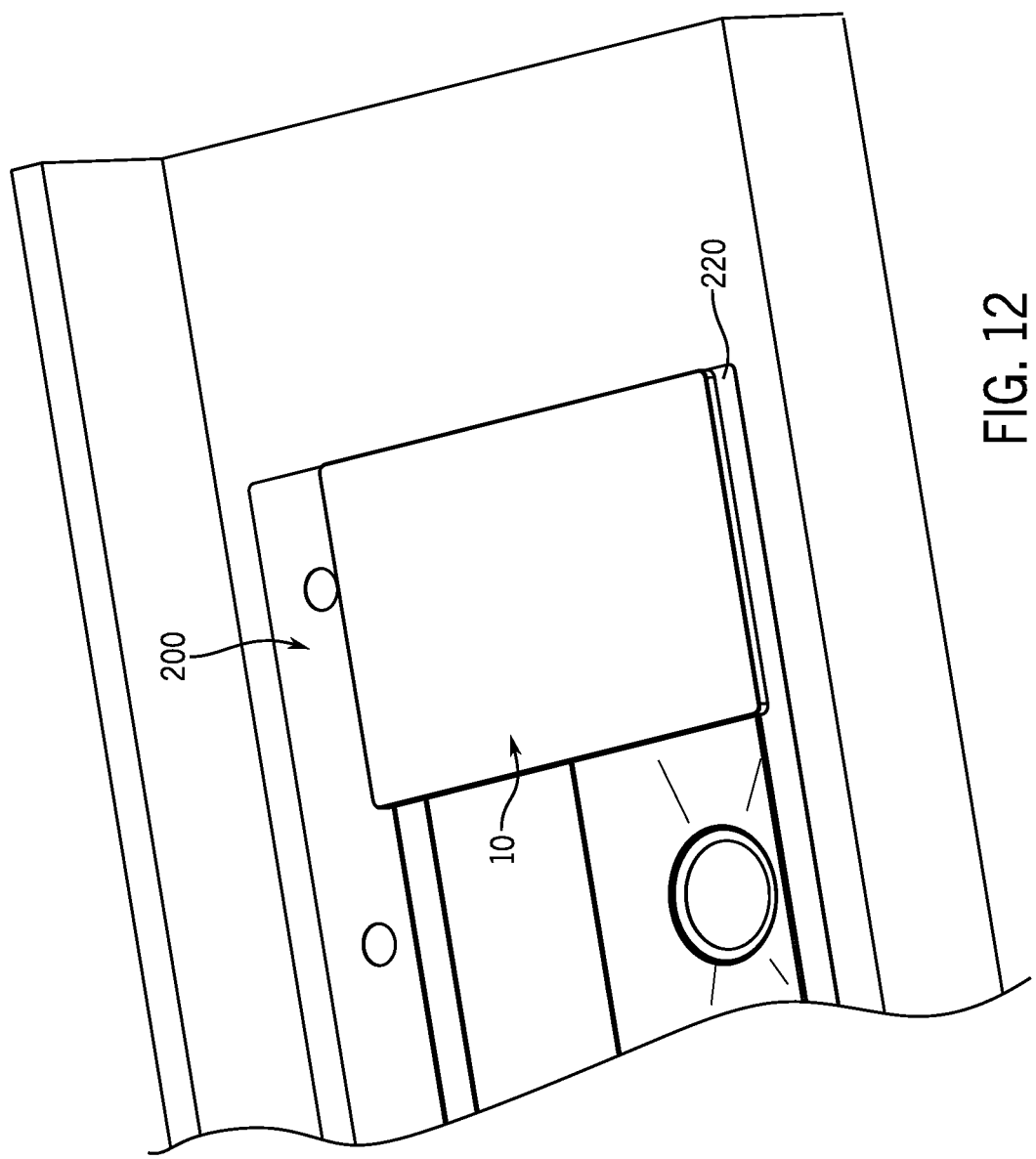
FIG. 12 is a perspective view of the cutting board of FIG. 1 engaged with a side edge of the top mount sink of FIG. 11.

Referring now to FIG. 8, the bottom portion 404 of the cutting board 10 includes offset walls 456, 458, which are spaced a distance from the top portion 402 along either side of the cutting board 10. Advantageously, the offset walls 456, 458 allow the cutting board 10 to slide over a side edge of the sink 200 or a side of a countertop cutout above the sink, thereby providing increased access to the basin 206. FIGS. 11-12 illustrate the cutting board 10 disposed above the basin 206 of a top mount sink 200, according to an exemplary embodiment. FIG. 11 shows the cutting board 10 spaced a distance away from a right side edge 218 of the sink 200, while FIG. 12 shows the cutting board 10 engaged with the right side edge 218. As shown in FIG. 12, the offset walls 456, 458 allow the cutting board 10 to extend beyond (e.g., cover or partially cover) the rim 220 of the sink 200 when positioned against the left side edge 216 or the right side edge 218 of the sink 200 (see FIG. 2). The offset configuration also spaces the cutting board 10 from the faucet escutcheon (i.e., allows the cutting board 10 to be positioned farther toward the left side edge 216 or the right side edge 218 of the sink 200) and reduces the risk that the cutting board 10 will interrupt the flow of water between the faucet and the basin 206. The geometry of the offset walls 456, 458 may vary depending on the needs of a user. In the embodiment of FIG. 8, an offset wall 456, 458 is included on either side of the cutting board 10 and is spaced from a side edge 460 of the cutting board 10 by approximately 1.5 in. In other embodiments, the spacing on one or both sides of the cutting board 10 may be different. In yet other embodiments, the offset wall 456, 458 on one or both sides may be beveled and/or include bumpers, similar to the first edge 408 and the second edge 412.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A cutting board having a top surface and a bottom surface opposite the top surface, the cutting board comprising:
   a bevel disposed along a first edge of the bottom surface, the bevel extending upwardly and outwardly from the bottom surface;
   an upper ledge extending outwardly beyond the bevel; and
   a bumper disposed directly on and extending downwardly and outwardly away from the bevel.

2. The cutting board of claim 1, wherein the cutting board is configured to engage with a rim of a sink along both a forward edge of the sink above a basin of the sink and a rear edge of the sink above the basin simultaneously.

3. The cutting board of claim 2, wherein the upper ledge is configured to engage the rim along one of the forward edge and the rear edge.

4. The cutting board of claim 1, wherein the bumper is positioned such that at least a portion of the bumper extends below a reference plane that is coplanar with the bottom surface of the cutting board.

5. The cutting board of claim 1, wherein the top surface is configured as a cutting surface for cutting a food product.

6. The cutting board of claim 1, wherein a first cross-sectional area of the cutting board through the upper ledge is greater than a second cross-sectional area of the cutting board through the bevel, and wherein each of the first cross-sectional area and the second cross-sectional area are substantially parallel to the top surface.

7. The cutting board of claim 1, wherein the upper ledge is shaped as a right prism with identical cross-sections along planes that are substantially parallel to the upper ledge.

8. The cutting board of claim 1, wherein the bevel forms an angle with a reference plane that is coplanar with the bottom surface of the cutting board, and wherein the angle is within a range between 30° and 60° inclusive.

9. The cutting board of claim 1, wherein the bevel is a first bevel of a plurality of bevels, wherein a second bevel of the plurality of bevels is disposed proximate to a second edge of the bottom surface opposite the first edge, wherein the second bevel extends in a direction that is substantially parallel to the first bevel, and wherein a second bumper is disposed on the second bevel.

10. The cutting board of claim 1, wherein the cutting board is configured to be disposed in a sink having a support bevel, wherein the support bevel is disposed along an upper edge of the sink, wherein the cutting board is configured to engage the sink with the bevel proximate to the support bevel, and wherein once engaged with the sink a gap is formed between the bumper and the support bevel that allows the cutting board to slide laterally from a first position above the sink to a second position above the sink.

11. A cutting board comprising:
    a body comprising:
      a bottom portion comprising:
        a bottom surface; and
        a bevel disposed along a first edge of the bottom surface, the bevel extending upwardly and outwardly from the bottom surface;
      a top portion comprising:
        a top surface oriented substantially parallel to the bottom surface; and
        an upper ledge extending outwardly beyond the bevel; and
    a bumper disposed directly on and extending downwardly and outwardly away from the bevel.

12. The cutting board of claim 11, wherein the cutting board is configured to engage with a rim of a sink along both a forward edge of the sink above a basin of the sink and a rear edge of the sink above the basin simultaneously.

13. The cutting board of claim 12, wherein the upper ledge is configured to engage the rim along one of the forward edge and the rear edge.

14. The cutting board of claim 11, wherein the bumper is positioned such that at least a portion of the bumper extends below a reference plane that is coplanar with the bottom surface of the cutting board.

15. The cutting board of claim 11, wherein the top surface is configured as a cutting surface for cutting a food product.

16. The cutting board of claim 11, wherein a first cross-sectional area of the top portion at a first location that is proximate to the bottom portion is greater than a second cross-sectional area of the bottom portion at a second location proximate to the top portion, and wherein each of the first cross-sectional area and the second cross-sectional area are substantially parallel to the top surface.

17. The cutting board of claim 11, wherein the top portion is shaped as a right prism with identical cross-sections along planes that are substantially parallel to the top surface.

18. The cutting board of claim 11, wherein the bevel forms an angle with a reference plane that is coplanar with the bottom surface of the cutting board, and wherein the angle is within a range between 30° and 60° inclusive.

19. The cutting board of claim 11, wherein the bevel is a first bevel of a plurality of bevels, wherein a second bevel of the plurality of bevels is disposed proximate to a second edge of the bottom surface opposite the first edge, wherein the second bevel extends in a direction that is substantially parallel to the first bevel, and wherein a second bumper is disposed on the second bevel.

20. The cutting board of claim 11, wherein the cutting board is configured to be disposed in a sink having a support bevel, wherein the support bevel is disposed along an upper edge of the sink, wherein the cutting board is configured to engage the sink with the bevel proximate to the support bevel, and wherein once engaged with the sink a gap is formed between the bumper and the support bevel that allows the cutting board to slide laterally from a first position above the sink to a second position above the sink.

* * * * *